United States Patent [19]

Okihara et al.

[11] Patent Number: 4,622,484
[45] Date of Patent: Nov. 11, 1986

[54] PIEZOELECTRIC RELAY WITH A PIEZOELECTRIC LONGITUDINAL EFFECT ACTUATOR

[75] Inventors: Naoto Okihara; Yoshiki Aihara; Kazutoshi Wakamatsu, all of Tokyo, Japan

[73] Assignee: NEC Corporation, Tokyo, Japan

[21] Appl. No.: 724,622

[22] Filed: Apr. 18, 1985

[30] Foreign Application Priority Data

| Jun. 21, 1984 | [JP] | Japan | 59-128992 |
| Jul. 5, 1984 | [JP] | Japan | 59-101703[U] |
| Jul. 27, 1984 | [JP] | Japan | 59-114568[U] |
| Oct. 24, 1984 | [JP] | Japan | 59-223224 |
| Feb. 6, 1985 | [JP] | Japan | 60-15710[U] |

[51] Int. Cl.$^4$ .......................................... H01L 41/08
[52] U.S. Cl. ................................. 310/328; 310/346
[58] Field of Search ............................. 310/328, 346

[56] References Cited

U.S. PATENT DOCUMENTS

| 2,878,452 | 3/1959 | Rohr et al. ............... 310/346 X |
| 3,688,135 | 8/1972 | Koda et al. ............... 310/346 X |
| 4,406,966 | 9/1983 | Paros ........................ 310/346 X |
| 4,454,442 | 6/1984 | Hosking ..................... 310/328 |
| 4,460,840 | 7/1984 | Weiger et al. .............. 310/328 |
| 4,518,887 | 5/1985 | Yano et al. ................. 310/328 |

OTHER PUBLICATIONS

Gordon & Breach, "Internal Electrode Piezoelectric Ceramic Actuator", By: Takahashi et al., 1983 vol. 50, pp. 181–190.

Proceedings of the 3rd Sensor Symposium 1983, pp. 261–265, "Piezoelectric Ceramic Tiny Actuators", by Ochi et al.

*Primary Examiner*—Mark O. Budd
*Attorney, Agent, or Firm*—Laff, Whitesel, Conte & Saret

[57] ABSTRACT

A miniature relay having dimensions in the order of 30 mm × 24 mm × 4 mm is driven by an expansion type piezoelectric actuator element. The actuator drives an interconnected series of lever arms which rest on a mounting block. The actuator rests on an anchor block. The coefficients of thermal expansion for the actuator, the mounting block and the anchor block are mutually cancelling.

6 Claims, 6 Drawing Figures

| L1 : 3.0 | h1 : 0.5 | t1 : 0.3 |
| L2 : 6.0 | h2 : 2.5 | t2 : 0.1 |
| L3 : 1.0 | h3 : 2.5 | t3 : 0.1 |
| L4 : 5.0 | h4 : 11.0 | t4 : 0.1 |
| L5 : 2.0 | h5 : 3.0 | t5 : 0.1 |
| L6 : 14.0 | | |

(UNIT : mm)

| | | |
|---|---|---|
| L1 : 3.0 | h1 : 0.5 | t1 : 0.3 |
| L2 : 6.0 | h2 : 2.5 | t2 : 0.1 |
| L3 : 1.0 | h3 : 2.5 | t3 : 0.1 |
| L4 : 5.0 | h4 : 11.0 | t4 : 0.1 |
| L5 : 2.0 | h5 : 3.0 | t5 : 0.1 |
| L6 : 14.0 | | |

(UNIT : mm)

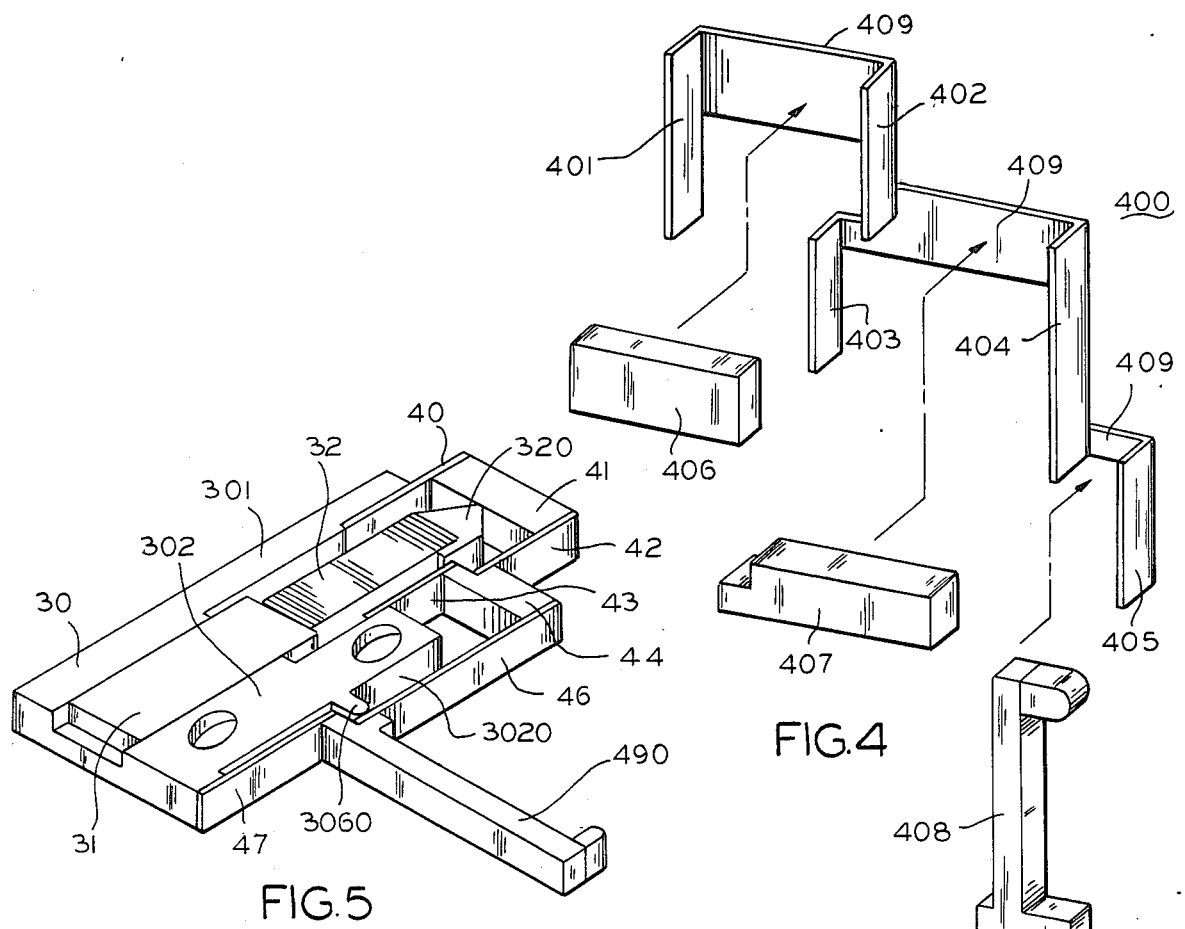
FIG.4
FIG.5
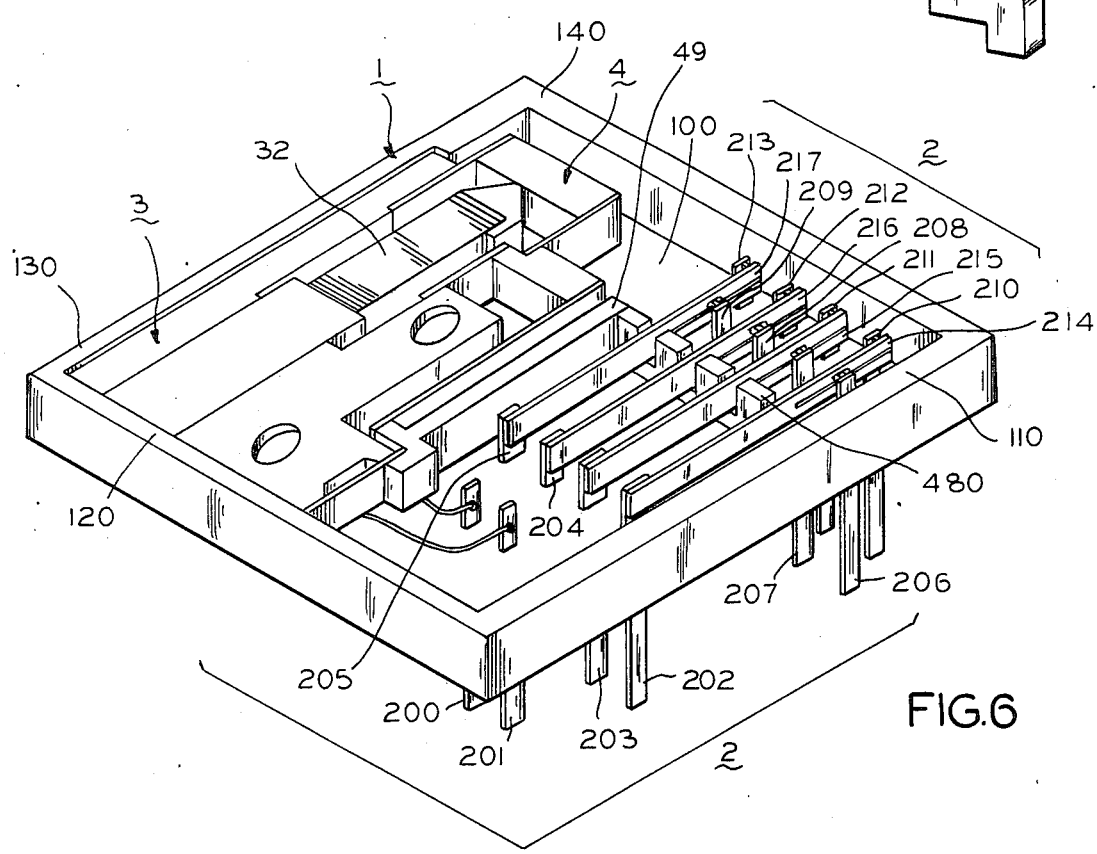
FIG.6

PIEZOELECTRIC RELAY WITH A PIEZOELECTRIC LONGITUDINAL EFFECT ACTUATOR

BACKGROUND OF THE INVENTION

This invention relates to a piezoelectric relay which uses a piezoelectric actuator as a contact driving source and, more particulary, to a piezoelectric relay having a multilayer piezoelectric actuator comprising a plurality of stacked piezoelectric ceramic laminates.

Almost all the relays which have been put into practical use are electromagnetic relays using exciting coils as the contact driving source. Even in the age when semiconductor technology has progressed remarkably, the demand for electromagnetic relays continues to increase in various fields because they endure higher voltage and have better switching characteristics, as compared with semiconductor switching elements. However, those relays which are equipped with the exciting coils cannot avoid having a large power comsumption, high heat generation, and large size fabrication. Also, the relays tend to generate magentic fields which affect adjacent circuit elements, such as those elements which are mounted on a printed wiring board.

Recently, in order to solve these and other problems of electromechanical relays, efforts have been made to develop piezoelectric relays which use a piezoelectric actuator, in place of the exciting coils, as the contact driving source. As is well known, a piezoelectric actuator is a transducer for converting between electrical energy and mechanical energy, the actuator physically deforms to cause a displacement responsive to an application of voltage onto piezoelectric ceramic laminates. The piezoelectric actuators are classified into the piezoelectric transverse effect type or bimorph type whose laminates are bendably displaced due to mechanical strain occurring in the vertical direction in response to an electrical field and the piezoelectric longitudinal effect type or multilayer type whose laminates are expandably displaced due to the mechanical strain occurring in the direction which is parallel to the electrical field.

The relays using the piezoelectric transverse effect type or bimorph type actuators as the contact driving source have been shown in the structures disclosed, for example, in U.S. Pat. Nos. 4,403,166 and 4,425, 524. In these relays, a bimorph type actuator can give a large displacement to a movable contact, but bending displacement which is caused by the expansion of two laminates consumes energy and inveitably lowers the energy conversion efficiency. If the relays are required to be miniaturized to be mounted with other circuit elements on a printed wiring board, they cannot apply sufficient contact pressure between a movable contact and a stationary contact. When the driving voltage is applied continuously to the bimorph type actuator, it becomes impossible to stably open and close the contacts for a long time of period, because there is a change in the displacement charcteristics. Therefore, the piezoelectric relays using the bimorph type actuators have heretofore not been put into practical use.

The relays using a piezoelectric longitudinal effect type actuator as the contact driving source, on the other hand, have a disadvantage because the degree of obtainable displacement is extremely small as compared with the relays using th bimorph type actuator. The disadvantage can be solved by increasing the voltage applied on the actuator to compensate for the electrical field intensity. However, the applicable voltage is necessarily limited within a certain range because the driving control circuit of the actuator has a low voltag resistance. However, such a limitation imposed on the applied voltage becomes a bottleneck problem in the practical use of the relays with this type of the actuators.

U.S. Pat. No. 4,454,442 discloses an example of a piezoelectric relay which attempts to solve the bottleneck problem. The relay disclosed therein has a structure which enables a minute displacement occurring in the longitudinally expandable piezoelectric body (actuator) to be magnified by a single resilient elongated member made of a dielectric material or by a mechanical amplification member so as to make connect between contacts. More particularly, in this type of relay structure, a minute displacement (several $\mu m$) of the piezoelectric body should be magnified several tens of times by bending the single resilient member to gain a sufficient distance (e.g. 0.55 mm) for moving the contacts. However, it is almost impossible to magnify the displacement at a high precision, in the case of a miniaturized relay.

SUMMARY OF THE INVENTION

An object of the present invention is, therefore, to provide a piezoelectric relay which has a piezoelectric longitudinal effect actuator as a contact driving source.

Another object of the present invention is to provide a piezoelectric relay which is equipped with a multistage displacement magnifying mechanism for effectively increasing the displacement without requiring an increment increase of the voltage applied on the actuator.

Still another object of the present invention is to provide a piezoelectric relay which can be operate stably irrespective of any thermal expansion of structural members which may occur due to ambient temperature variation.

Further object of the present invention is to provide a piezoelectric relay of a small size and particularly of a thin type which can be mounted on a printed wiring board together with other circuit elements.

Still further object of the present invention is to provide a piezoelectric relay with structural members which can be easily assembled at a high precision.

According to one aspect of the invention, a piezoelectric relay comprises a base frame made of a synthetic resin having a base plate. A first block has a first arm and a second arm which extend in parallel with each other and a connection channel which connects the arms, all of which are fixed on the base plate. A second block engages the connection channel of the first block. The relay further includes a piezoelectric actuator with one end portion extending in the axial direction while abutting on the second block and the other end portion having a driving chip, which is arranged between the first arm and the second arm of the first block. The actuator is expansion-displaced in the axial direction in response to an applied voltage. The relay still further includes displacement magnifying means having an input section which responds to the displacement of the actuator, and a first-stage magnifying section and a second-stage magnifying section which sequentially magnify the output displacement of the input section. A movable resilient member is driven by the magnifying means to establish a connection between a movable contact and a stationary contact. The relay also is charcterized in that the relationship is satisfied as $\Delta l_2 = \Delta l_3 - \Delta l_1$ wherein the dimensional variations caused by the various temperature variations among the actuator, the first block and the second block are denoted respectively as $-\Delta l_1$, $\Delta l_2$, and $\Delta l_3$.

BRIEF DESCRIPTION OF THE DRAWINGS

The above and other objects and features of th invention may be fully understood from the following detailed description and the accompanying drawings in which:

FIG. 4 is an exploded perspective view of a first modification to the displacment magnifying mechanism shown in FIGS. 1, 2, and 3;

FIG. 5 is a perspective view of a second modification to the displacement magnifying mechanism shown in FIGS. 1, 2 and 3 and of a slightly modified contact driving mechanism; and FIG. 6 is a perspective view of a second embodiment of the invention.

In the drawings, the same reference numerals denote identical structural elements.

DESCRIPTION OF THE PREFERRED EMBODIMENT

Figure 1:
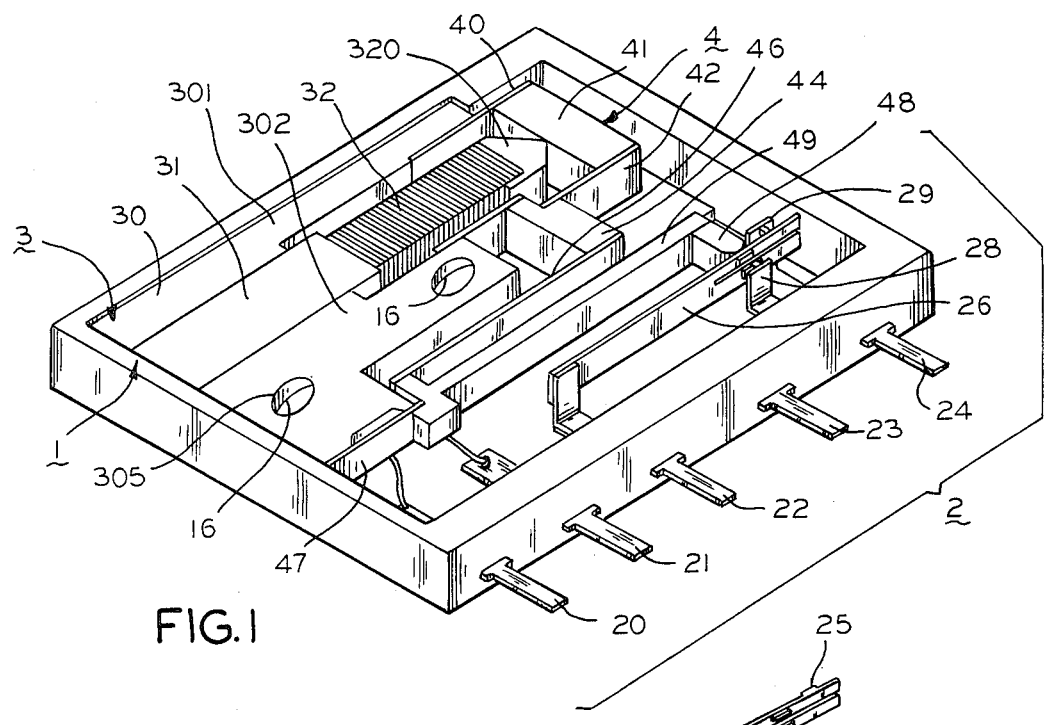
FIG. 1 is a perspective view of the first embodiment of the invention.
Figure 2:
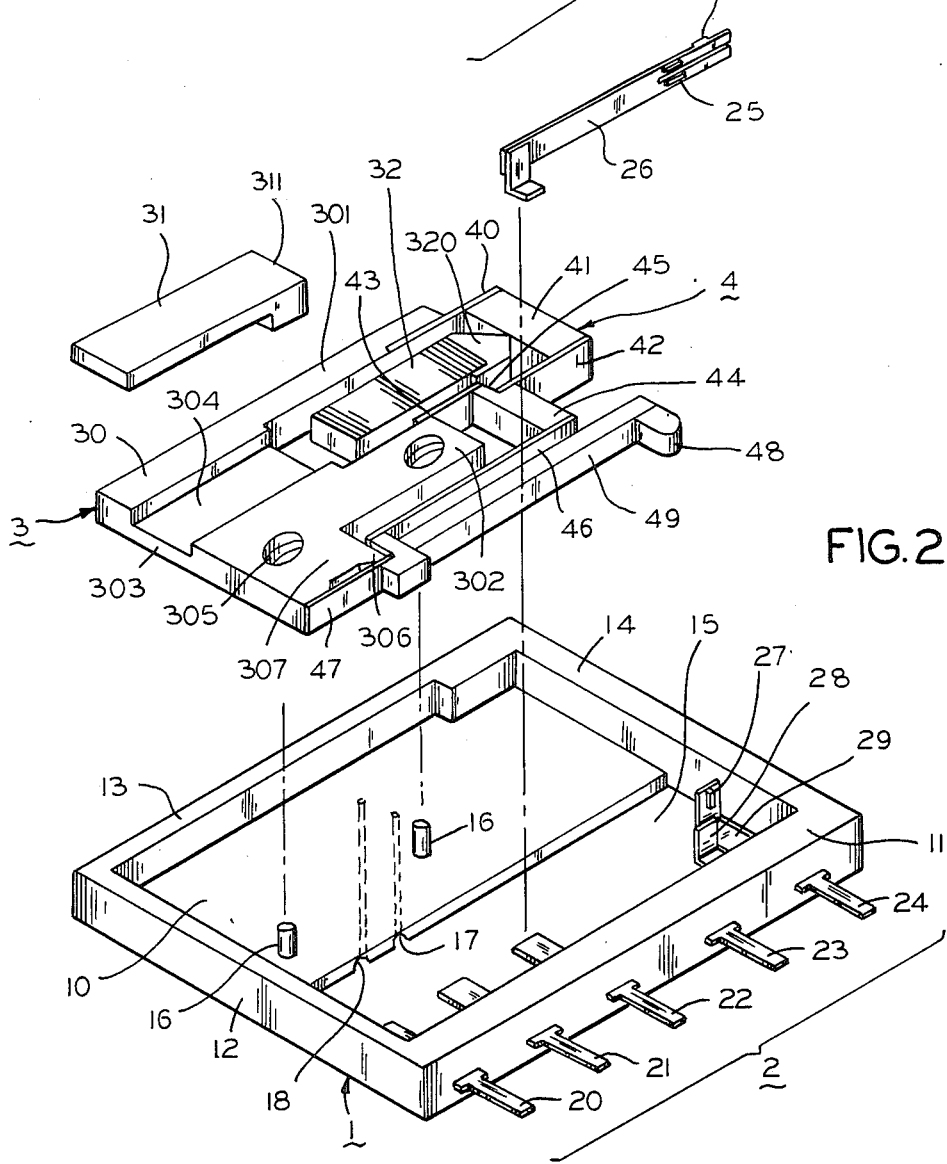
FIG. 2 is an exploded perspective view of the relay shown in FIG. 1.

Referring to the FIGS. 1 and 2, a piezoelectric relay in the first embodiment of the invention comprises a base frame 1, a terminal assembly 2, a contact driving mechanism 3, and a displacement magnifying mechanism 4. The base frame 1 is made of synthetic resin and comprises a base plate 10, erect walls 11, 12, 13 and 14 and a rectangular window 15.

The base plate 10 is provided with a pair of projections 16. The terminal assembly 2 has a plurality of terminals 20, 21, 22, 23 and 24 which penetrate through the wall 11 of the base frame 1 and are fixed therein. The terminals 20 and 21 are used to supply electrical voltage to a piezoelectric actuator, which will be described hereinafter in detail. The wires connected to the terminals 20 and 21 pass through a pair of tunnels 17 and 18 which are bored or otherwise formed in the base plate 10.

One end of a movable contact spring 26 is welded to the terminal 22 while the spring 26 is fixed to a movable contact 25 on the other end. Stationary contact terminals 28 and 29, each with a fixed stationary contact 27, are welded to the terminals 23 and 24 in a manner to oppose the spring 26.

The contact driving mechanism 3 has a base block 30 with a substantially U-shaped cross section. The block 30 has a first arm 301 and a second arm 302 which extend in parallel to each other, but which have different lengths. A connection channel 303 connects the arms 301 and 302. The channel 303 has a guide groove 304 with which a push block 31 engages. One end 311 of the push block 31 is positioned in a space between the first arm 301 and the second arm 302 to support a piezoelectric actuator 32. When the mechanism 3 is pre-assembled with the displacement magnifying mechanism 4, the push block 31 is used to position the actuator 32 against the magnifying mechanism 4 with a very high dimensional precision. After this arrangement is completed, the push block 31 is welded to the base block 30.

The second arm 302 of the block 30 is bored or otherwise formed to have a pair of holes 305 which receive the pair of projections 16 of the base frame 1. The arm 302 is further provided with an extension portion 307 having a stopper 306. The function of the stopper 306 will be described herinafter together with the description of the magnifying mechanism 4.

In this embodiment, a piezoelectric longituindal effect type actuator (a multi-layer piezoelectric actuator) is used as the piezoelectric actuator 32. The actuator 32 comprises 128 ceramic laminates of Pb (Ni$\frac{1}{3}$, Nb$\frac{2}{3}$)O$_3$—PbTiO$_3$—PbZrO$_3$ which are stacked with internal electrodes. The thickness of each of the laminates is 60 $\mu$m. The actuator 32 has the length of 9 mm, incuding internal electrodes, the width of 3 mm, and the height of 2 mm in external dimension. The actuator 32 causes minute displacement of 7.8 $\mu$m and generates force of 21,000 g with a driving voltage of DC 60 V and has the energy conversion efficiency of 49%. The piezoelectric actuator of this type can be fabricated by using the technologies described in (1) a paper titled "*Internal Electrode Piezoelectric Ceramic Actuator*", S. Takahashi et al, published in the Ferroelectrics, 1983 Vol. 50, pp. 181–190, and (2) a paper titled "Piezoelectric Ceramic Tiny Actuators", A. Ochi et al, published in the Proceeding of the 3rd Sensor Symposium, 1983, pp. 261–265. One end of the actuator 32 has a driving or push chip 320 with a sharp tip angle.

The displacement magnifying mechanism 4 magnifies the minute displacement (7.8 $\mu$m) caused by the piezoelectric actuator 32 of the contact driving mechanism 3 about seventy times (0.55 mm) before it transmits the displacement to the contact spring 26. The mechanism 4 comprise an input section which receives as its input the displacement and force applied from the actuator 32 via the push chip 320. Mechanism 4 also has a first-stage and a second-stage magnifying sections which magnify the displacement and the output force from the input section.

The input section comprises a first resilient hinge lever 40 which is on the first arm 301 of the base block 30 and a first non-resilient (hard) lever 41 which is fixed on the lever 40 on one end thereof. The arm 41 is pressed by the push chip 320 at about the center of the longitudinal length. The first-stage magnifying section comprises a second resilient hinge lever 42 fixed on the other end of the first hard lever 41, a third resilient hinge lever 43 fixed on one end thereof to the second arm 302 of the base block 30 and a second hard lever 44 fixed at one end thereof on the second and the third levers 42 and 43.

More specifically, the lever 44 is cut to have a step 45. The levers 42 and 43 are fixed respectively at two different locations which are divided by the step 45. The second-stage magnifying section comprises a fourth resilient hing lever 467 fixed on the other end of the second hard lever 44, a fifth resilient hinge lever 47 fixed at one end of the extension portion 307 of the base block 30, and a third hard lever or driving lever 49 fixed on the hinge levers 46 and 47. A driving chip 48 made of a synthetic resin is fixed on the other end. The levers 41, 42, 43, 44, 45, 46, 47, and 49 are welded to the base block 30 at the pre-assembling stage.

The magnified output displacement of the mechanism 4 of the above-mentioned structure can theoretically be obtained by a multiplication of the input displacement with the respective lever ratios. In reality, however, the output displacement and the output force are varied by the combination of dimensions of the structural members (i.e., levers 41, 42, 43, 44, 45, 46, 47 and 49) of the magnifying mechanism 4. The inventors have obtained optimal dimensions of the structural members for driving the relay contact by using the finite element method (FEM) of analysis. In designing the high efficiency displacement magnifying mechanism 4 by means of the FEM analysis, the most important factor is the length among the point of force, the fulcrum, the point of the application of each hard lever (namely lever ratio) and the spring stiffness of each hinge lever.

Figure 3:
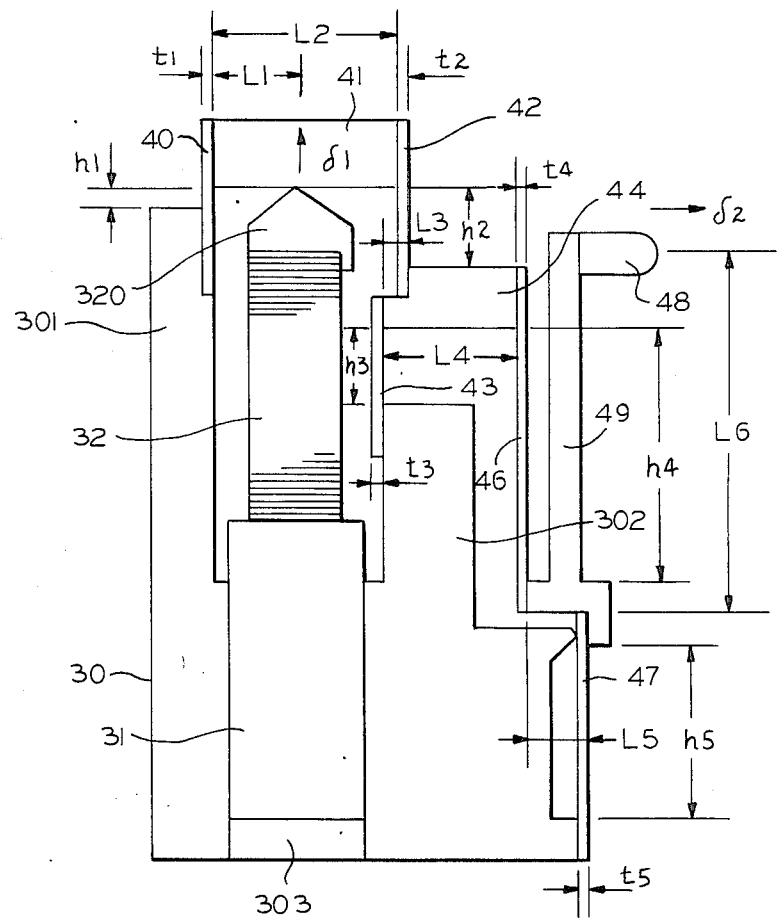
FIG. 3 is a plan view for describing the contact driving mechanism and the displacement magnifying mechanism of the relay shown in FIGS. 1 and 2.

FIG. 3 shows an example of the mechanism 4 wherein the dimensions of the members are obtained by the FEM analysis. Referring to FIG. 3, the mechanisms 3 and 4 are described in more detail. Each of the structural members of the mechanisms 3 and 4 is preferably made of metal so that it can effectively respond to an input displacement ($\delta 1$) caused by the piezoelectric actuator 32 in the magnifying mechanism 4 and can magnify the displacement ($\delta 1$) by about 70 times to obtain displacement ($\delta 2$). However, due to the difference in thermal expansion coefficients caused by ambient temperature between the actuator 32 and other metal members, the displacement ($\delta 1$) from the actuator 32 may not effectively be transmitted. In the worst case, an air gap may be generated among the actuator 32 and other metal members which completely incapacitates the actuator 32. In order to solve such problems, the base block 30 and the push chip 320 of the contact driving mechanism 3 are made of invar (an alloy of Fe-Ni 36) while the push block 31 is made of stainless steel. All the levers 41 through 47 and 49 of the magnifying mechanism 4 are made of invar.

If a piezoelectric relay is used at about 120° C. or below, the actuator 32 shrinks by a minute dimension $-\Delta l_1$ as a normal scope of the permissible operational temperature ranges from $-20°$ C. to $+80°$ C. and the thermal expansion coefficient $\alpha$ of the actuator 32 is about $-6 \times 10^{-6}/°C$. The base block 30 and the magnifying mechanism 4, which is made of invar of $\alpha = 1.2 \times 10^{-6}/°C$., expand by a minute dimension $\Delta l_2$ while the push block 31 made of stainless steel of $\alpha = 17 \times 10^{-6}/°C$. expands by a relatively large dimension $\Delta l_3$. The dminesional variation caused by termperature variations can terefore be compensated if the relation $\Delta l_2 = \Delta l_3 - \Delta l_1$ is satisfied.

The fourth and the fifth resilient hinge levers 46 and 47 and the third hard lever 49 may be made of stainless steel, since the levers 46, 47 and 49 are not greatly related to the temperature compensation. As above-described, the push block 31 is arranged serially to the actuator 32 to compensate for the difference in the thermal expansion coefficients $\alpha$ between the actuator 32 of the mechanisms 3 and 4, thereby realizing a piezoelectric relay which can operate stably irrespective of the variation in the ambient termperature.

Referring now again to FIGS. 1 and 2, a stopper 306 is provided on the extension portion 307 of the contact driving mechanism 3. Stopper 306 abuts against the fifth hinge lever 47 supporting the third hard lever 49 of the magnifying mechanism 4. This arrangement not only enables an effective transmission of the magnified displacement ($\delta 2$) from the lever 49 to movable contact spring 26, but also restricts vibration which might be caused when the lever 49 releases its position to perform a high speed switching operation.

The piezoelectric relay according to the above-mentioned embodiment of the invention is usually housed in a cover (not shown). If necessary, it may be hermetically sealed with a plastic resin. The terminals 20, 21, 22, 23 and 24 led out of the base frame 1 may be bent if necessary. The relay has the length of 30 mm, the width of 24 mm and the height (thickness) of 4 mm in external dimensions and has the weight of 6.5 g (grams). Further, the nominal drive voltage is DC 60 V and, when operating time is 5 mS, the maximum consumption current is 3 mA in operating stage.

Referring to FIG. 4, a first modification of mechanism 4 shown in FIGS. 1, 2 and 3 includes a magnifying mechanism 400 formed by punching out first, second, third, fourth and fifth resilient hinge levers 401, 402, 403, 404, and 405 from a sheet of invar metal, bending the levers in predetermined forms, and welding first, second and third hard lever 406, 407 and 408, respectively, to connection channels 409 which connect the hinge levers 401 to 405 to one another. The stiffness of the hard levers 406, 407 and 408 can be reinforced by this arrangement. The numbers of both the welding portions and the assembling structural members can be reduced to simplify the assembly process.

FIG. 5 shows a second modification to the mechanism 4 and a modification to the driving mechanism 3. As compared with the structure shown in FIGS. 1, 2 and 3, these modifications provide a stopper 3060 directly on the side wall 3020 of the second arm 302. The extension portion 307 is deleted from the base block 30 of the mechanism 3. Further, the stopper 3060 abuts on the place where the fourth hinge lever 46 and th third hard lever 490 are fixed. The lever 490 extends in the vertical direction to the fourth and fifth hinge levers 46 and 47. The function of the stopper 3060 in the mechanism 3 and the dispalcement magnifying function of the mechanism 4 are similar to the first embodiment.

Referring to FIG. 6, a piezoelectric relay in the second embodiment of the invention comprise a base frame 1, a terminal asembly 2, a contact driving mechanism 3, and displacement magnifying mechanism 4.

In the relay all the terminals 200 through 213 are implanted on a base plate 100 of the base frame 1. Erect walls 110, 120, 130 and 140 of the frame 1 are on four sides of the plate 100 respectively. Movable contact springs 214, 215, 216 and 217 having movable contacts are welded to the terminals 202, 203, 204 and 205. The terminals 206 to 213 have stationary contacts. Four movable contact springs 202 to 205 are driven simultaneously by a driving chip or ladder 480 of a comb-like form fixed on the third hard lever 49. Therefore, the relay has four-transfer type contacts.

Other structural members are basically similar to those of the first embodiment. However, the size of the piezoelectric actuator 32 and the mechanism 4, of this embodiment, should be slightly increased in order to cope with the increase of the contact loading. The size can be optimized in accordance with the above-mentioned design method. Any cover (not shown) may be used so long as if fits with the shape of an opening of the base frame 1.

Other alternatives and modifications to the above-mentioned embodiments can be made within the scope of the invention defined by the appended claims.

What is claimed is:

1. A piezoelectric relay comprising:

a base frame made of synthetic resin and having a base plate;

a first block having a first arm and a second arm extending in parallel with each other, and a connection channel fixed on said base plate for interconnecting said arms;

a second block engaged with said connection channel of said first block;

an elongated piezoelectric actuator having one end portion abutting against said second block and extending in the axial direction thereof, said actuator having a driving chip on its other end portion thereof, said actuator being arranged between said first arm and said second arm of said first block, and being expansion-displaced in said axial direction in response to applied voltage;

displacement magnifying means having an input section for receiving as an input the displacement from said actuator, and a first-stage magnifying section and a second-stage magnifying section for sequentially magnifying the output displacement of said input section; said input section of said displacement magnifying means comprising a first resilient lever having one end which is fixed to said first arm of said first block, a first non-resilient lever which is fixed at one end portion thereof to the other end portion of said resilient lever, said first non-resilient lever abutting against said driving chip of said actuator at substantially a center portion thereof; said first-stage magnifying section comprising a second resilient lever which is fixed at one end portion thereof to the other end portion of said first non-resilient lever, a third resilient lever which is fixed at one end portion thereof to said second arm of said first block, a second non-resilient lever which is fixed at one end portion thereof to the other end portion of said second and third resilient levers; said second-stage magnifying section comprising a fourth resilient lever which is fixed at one end portion thereof to the other end portion of said second non-resilient lever, a fifth resilient lever which is fixed at one end portion thereof to the other end portion of said second arm, said second arm of said first block having a stopper which abuts on at least one of said fourth and fifth resilient levers of said magnifying means, a third non-resilient lever which is fixed at one end portion thereof to the other end portion of said fourth and fifth resilient levers; and a movable resilient member driven by said magnifying means to connect between a movable contact and a stationary contact;

wherein $\Delta l_2 = \Delta l_3 - \Delta l_1$ is satisfied where the dimensional variations caused by the temperature variation among said actuator, said first block, and said second block are $-\Delta l_1$, $\Delta l_2$, and $\Delta l_3$, respectively.

2. The piezoelectric relay as claimed in claim 1, wherein said first block is made of invar.

3. The piezoelectric relay as claimed in claim 2, wherein said second block is made of stainless steel.

4. The piezoelectric relay as claimed in claim 1, wherein said first, second, third, fourth and fifth resilient levers and said first, second and third nonresilient levers of said magnifying means are made of invar.

5. The piezoelectric relay as claimed in claim 1, wherein said first, second and third resilient levers and said frist and second non-resilient levers of said magnifying means are made of invar; and said fourth and fifth resilient levers and said third non-resilient lever are made of stainless steel.

6. The relay of claim 1 and a plurality of movable contacts springs, and ladder means coupled between said movable resilient driven member and said movable contacts springs.

* * * * *